Figure 1A:
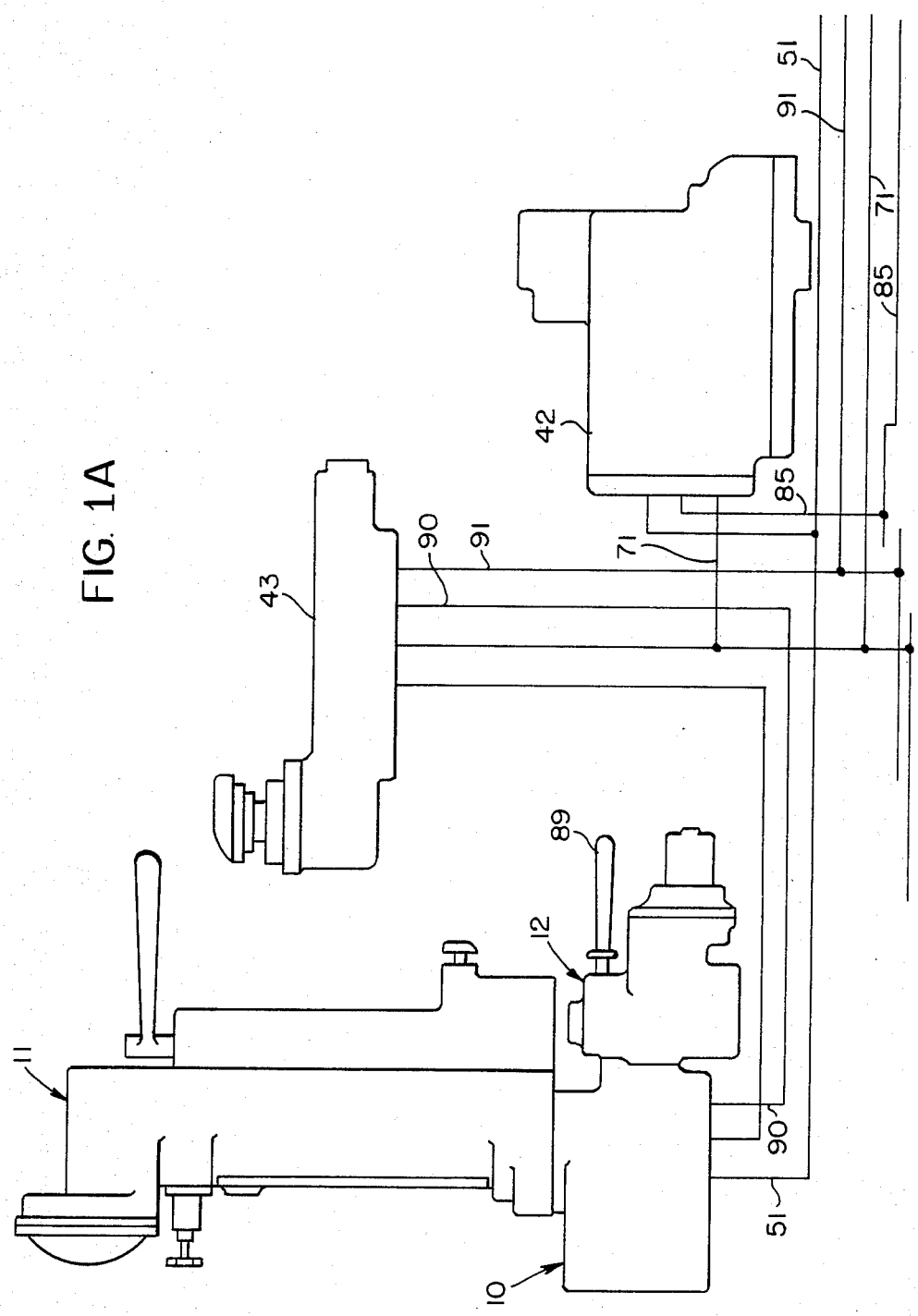

United States Patent [19]

Newton et al.

[11] Patent Number: 4,509,801
[45] Date of Patent: Apr. 9, 1985

[54] FLUID PRESSURE BRAKE CONTROL SYSTEMS FOR FREIGHT LOCOMOTIVES

[75] Inventors: Ronald O. Newton, Adams; Eric Wright, Watertown, both of N.Y.

[73] Assignee: General Signal Corporation, Stamford, Conn.

[21] Appl. No.: 553,332

[22] Filed: Nov. 18, 1983

[51] Int. Cl.³ .............................................. B60T 13/00
[52] U.S. Cl. ......................................... 303/8; 303/25; 303/36; 303/82
[58] Field of Search .................... 303/33, 36, 38, 82, 303/25-27, 28-30, 32, 8, 40, 68-69, 13, 86, 81, 80, 74, 35, 37, 39, 44

[56] References Cited

U.S. PATENT DOCUMENTS

| | | | |
|---|---|---|---|
| 2,858,170 | 10/1958 | McClure et al. | 303/36 |
| 2,958,561 | 11/1960 | May | 303/8 |
| 3,272,565 | 9/1966 | Wilson | 303/8 |
| 4,113,319 | 9/1978 | Zoric | 303/37 |

*Primary Examiner*—Douglas C. Butler

*Attorney, Agent, or Firm*—Thomas R. FitzGerald; Harold Wynn

[57] ABSTRACT

A fluid pressure brake control system of the direct release type for a freight locomotive comprises a first pipe bracket having a manually controllable automatic brake valve device connected thereto on one side for governing fluid brake control pressure in a train pipe, and a manually controllable independent brake valve device is connected on another side of the bracket for governing brakes of the locomotive independent of brakes of freight cars in a train. There is a locomotive brake control valve device comprising a second pipe bracket having a service valve portion secured to one side thereof corresponding to a service valve portion such as is conventionally used on freight car control valve devices. A quick release and emergency valve portion is secured to another side of the second pipe bracket for governing emergency brake pressure and for governing independent direct release of brakes of a locomotive in response to actuation of the manually controllable independent brake valve device.

7 Claims, 3 Drawing Figures

FLUID PRESSURE BRAKE CONTROL SYSTEMS FOR FREIGHT LOCOMOTIVES

REFERENCE TO PRIOR CASES

This invention is related to the May U.S. Pat. No. 2,958,561, the Wilson U.S. Pat. No. 3,272,565 and the Zoric U.S. Pat. No. 4,113,319 which are in part incorporated herein by reference for defining background material for the present invention.

BACKGROUND OF THE INVENTION

This invention relates to fluid brake control systems for locomotives, and it more particularly relates to such systems of the direct release type for a freight locomotive.

Locomotive brake systems are generally of the type disclosed in the May U.S. Pat. No. 2,958,561 and in the Wilson U.S. Pat. No. 3,272,565, wherein the system is readily convertible to operate as a passenger locomotive or as a freight locomotive. The principal difference in operation is that passenger train braking systems have graduated release of brake applications, while freight train braking systems have direct release of brake applications. The graduated release requires proportioning valves, and the like, that are not required in the braking systems for freight trains. Because of the reduced demand for passenger train service in general, only a limited number of locomotives are ever used for passenger service, although they have the expensive graduated release apparatus for passenger service which is never used if the locomotives are used only in freight trains.

Therefore considerable savings in cost of original equipment and cost of maintenance of locomotive braking systems used only for freight service can be realized if equipment used only for passenger service can be deleted.

An object of the present invention is to obviate one or more of the limitations and disadvantages of the described prior art systems.

Another object of the present invention is to materially reduce equipment and maintenance costs of braking equipment for a freight locomotive.

Other objects, purposes and characteristic features of the present invention will be in part obvious from the accompanying drawings, and in part pointed out as the description of the invention progresses.

SUMMARY OF THE INVENTION

A fluid pressure brake control system of the direct release type is provided for a freight locomotive comprising a first pipe bracket having a manually controllable automatic brake valve device connected thereto on one side for governing fluid brake control pressure in a train pipe, and a manually controllable independent brake valve device is connected thereto on another side for governing brakes of the locomotive independent of brakes of freight cars in a train. A brake control valve device comprises a second pipe bracket governed at times by the brake pipe pressure and at other times by the manually controllable independent brake valve device for controlling brakes of the freight locomotive.

A service freight brake valve portion is secured to one side of the second pipe bracket for controlling service brake applications of the freight locomotive, the service brake valve portion being substantially the same as an interchangeable service valve portion conventionally used on U.S. freight cars to control service brake applications of such cars.

A quick release and emergency valve portion is secured to another side of the second pipe bracket for governing emergency brake pressure and for governing independent direct release of brakes of a locomotive in response to actuation of the manually controllable independent brake valve device.

IN THE DRAWINGS

Figure 1B:
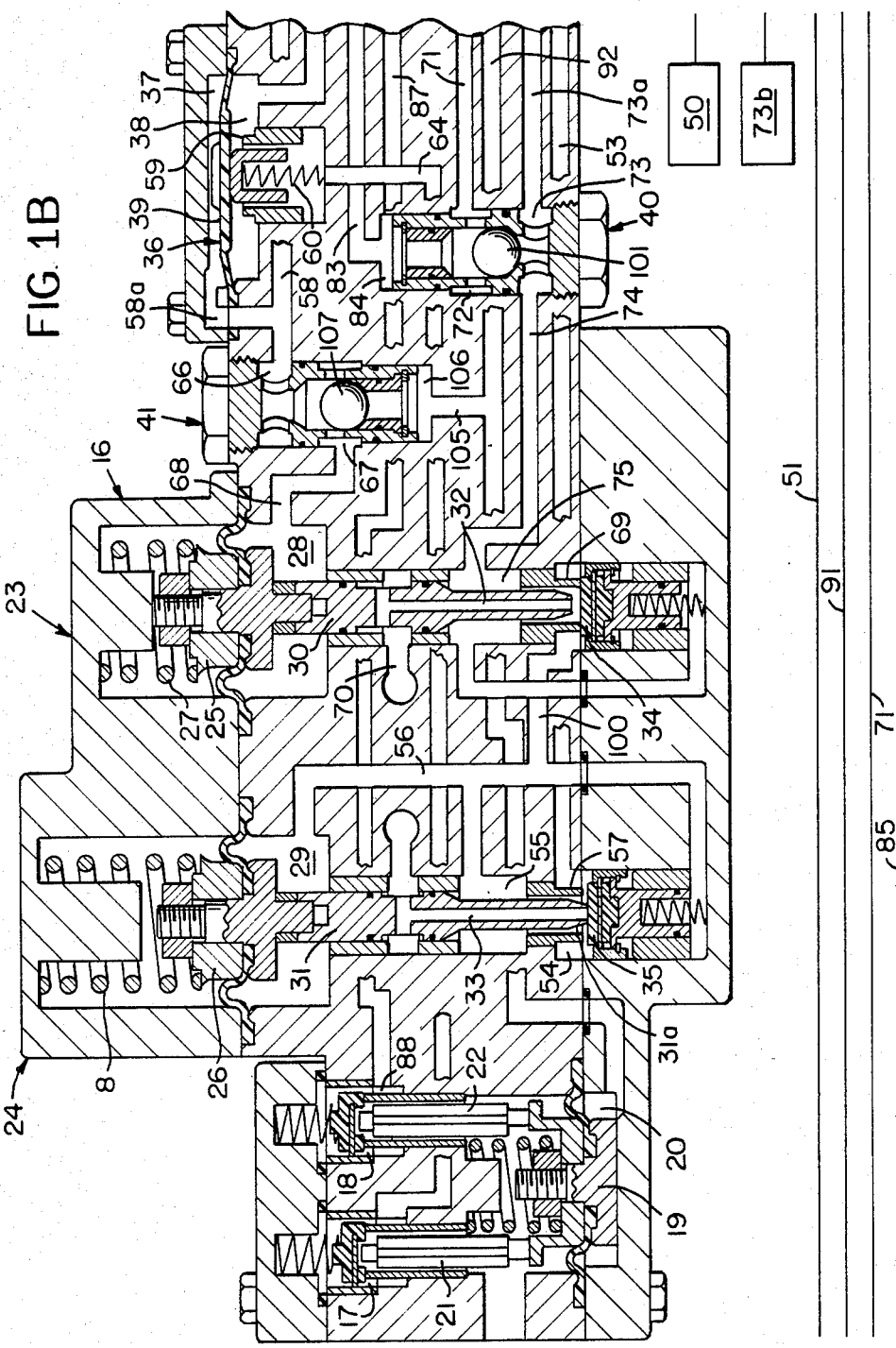
Figure 1C:
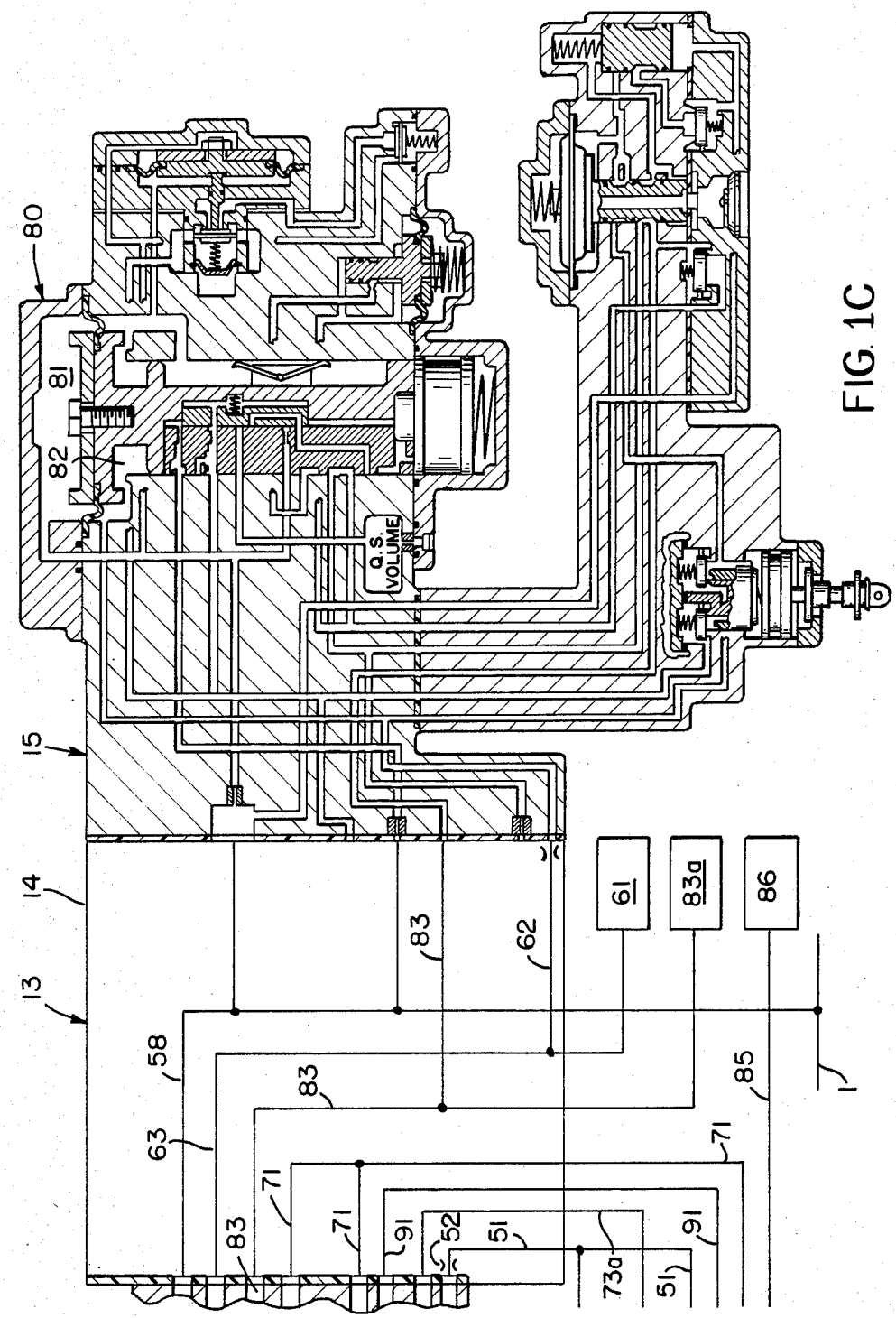

FIGS. 1A, 1B, and 1C, when placed end to end respectively illustrate diagrammatically, with some parts shown in elevational cross section, a freight brake control system for a freight locomotive according to a preferred embodiment of the present invention.

With reference to FIG. 1A, the freight locomotive brake control system, according to the present invention, comprises a first pipe bracket 10 having a manually controllable automatic brake valve device 11 connected thereto on one side for governing brake pipe pressure controlling both locomotive and train brakes, while a manually controllable independent brake valve device 12 is provided for governing brakes of the locomotive independent of brakes of freight cars in a train. A brake control valve device 13 comprises a second pipe bracket 14, a service portion 15, and a quick release and emergency valve portion 16.

The service portion 15 corresponds to and is interchangeable with the service portions in conventional freight brake control valves of the well known "ABD" type of system such as is disclosed in the service portion 5 shown in FIG. 1A of the Zoric U.S. Pat. No. 4,113,319. This service portion is much less expensive to build and to maintain then the more complex proportioning valve type of service portion that is currently used in locomotive brake equipment wherein the service portion is adapted for graduated or direct release in accordance with whether the locomotive is designated for use in connection with a passenger train or a freight train. Such a service portion is disclosed, for example, in the service portion 10 of FIG. 1A in the Wilson U.S. Pat. No. 3,272,565.

The quick release and emergency valve portion 16 comprises normally closed check valves 17 and 18 for venting auxiliary reservoir pressure and brake cylinder pilot control pressure respectively upon upward movement of a piston 19 in response to pressure indicative of a designated independent brake cylinder release by pressurizing a chamber 20. Push rods 21 and 22 operably connect the check valves 17 and 18 to the piston 19 so that they are both actuated to an open position in accordance with the upward movement of piston 19.

The quick release and emergency valve portion 16 also comprises an emergency valve 23 and an emergency limiting valve 24. The valves 23 and 24 have respective pistons 25 and 26 that are biased downwardly by springs 27 and 8 respectively in opposition to pressures in chambers 28 and 29 that are respectively brake pipe or independent release pressures (chamber 28) and emergency brake cylinder feed back pressure (chamber 29).

The pistons 25 and 26 have spool valves 30 and 31 connected thereto respectively which have respective axial vent passages 32 and 33. The lower ends of the spool valves 32 and 33 selectively actuate similar pressure balanced check valves 34 and 35 respectively.

A diaphragm valve 36 has brake pipe pressure applied in a chamber 37 above the valve in opposition to auxiliary pressure from the service portion 15 being applied in chamber 38 below diaphragm 39 of valve 36. Double check valves 40 and 41 are used in the selection of brake cylinder pilot control and release of emergency applications respectively.

With reference to FIG. 1A, a conventional relay valve 42 is provided for delivering braking pressure to the locomotive brake cylinders in accordance with a pilot signal furnished by the brake control valve device 13. A manually operable multiple unit valve 43 is provided in the usual manner for governing connections with other locomotives.

Having described the apparatus provided according to the present invention for a locomotive freight brake control system, consideration will now be given to the mode of operation, relying to a limited extend upon disclosures in the prior U.S. Patents for general mode of operation of a system that had been described as background of the invention, and that is well known to those skilled in the art. Thus, the mode of operation described is more specific relative to the quick release and emergency valve portion.

CHARGING AND RELEASE

With reference to FIG. 1B, a main reservoir 50 is maintained at a normal pressure of approximately 150 psi by a usual locomotive compressor (not shown). Pressure from reservoir 50 is applied over passage 51, through a choke 52, and passage 53 to an area 54 around the supply seat of check valve 35 at the base of emergency limiting valve 24. Fluid flows from the area 54 around the outside of spool 31 to a chamber 55 and through a passage 56 to a chamber 29 below the piston 26. As soon as pressure in chamber 29 builds up to overcome opposing pressure of spring 8, piston 26 moves upwardly to a point where check valve 35 assumes a lap position. This lap position is obtained when spool valve seat 31a and supply valve seat 57 are in contact with the check valve 35. This mode of operation is effective during emergency application to limit the emergency braking pressure. Valve 24 is adjustable to apply difference limiting pressures by shimming spring 8, or by selectively substituting springs 8 having different forces.

Brake pipe pressure is applied from the brake pipe 1 (see FIG. 1C) over passages 58 and 58a to the top chamber 37 of diaphragm valve 36, forcing it downwardly to its seat 59, and thus compressing spring 60 until the auxiliary reservoir 61 has been charged over passage 62 by the service valve portion 15. When the brake pipe 1 and the auxiliary reservoir 61 are fully charged, diaphragm valve 36 moves upwardly, allowing auxiliary reservoir pressure to be connected through passage 63 chamber 38, valve 59, and passage 64 to normally closed check valve 17.

Brake pipe pressure is also applied to chamber 28 below piston 25 in emergency valve 16 through passage 58, upper chamber 66 of double check valve 41, intermediate chamber 67 of double check valve 41 and passage 68. When pressure in chamber 28 is approximately 25 psi, emergency piston 25 moves upward, and this allows check valve 34 to become seated on the supply seat 69. Emergency brake cylinder pilot pressure can now be vented to exhaust through the center exhaust port 70 of emergency valve 23. The venting of the brake cylinder pilot pressure reduces pressure in the relay valve 42 (see FIG. 1A) through passage 71, center chamber 72 of two way check valve 40, lower chamber 73 of two way check valve 40, passage 74, chamber 75 in spool valve 30, and through the axial passage 32 of the spool valve 30 to the exhaust chamber 70.

SERVICE APPLICATION AND RELEASE

During a service application, the service portion 15 senses a service reduction by upward actuation of service valve 80 upon comparing brake pipe and auxiliary reservoir pressures in the chambers 81 and 82 respectively. This actuation of service valve 80 applies an output brake cylinder pilot pressure over passage 83 to an upper chamber 84 of double check valve 40, and through central chamber 72 of that valve over passage 71 to the relay valve 42 of FIG. 1A, in which brake cylinder pressure is developed and applied over passage 85 to the locomotive brake cylinders including the brake cylinder 86 illustrated in FIG. 1C. The pilot pressure in passage 71 (see FIG. 1C) is also applied to a chamber 88 of check valve 18. This provides a means of releasing pilot pressure during independent release of the locomotive brakes as will be hereinafter considered.

An equalizing volume 83a is connected to the passage 83 to compensate for the smaller volume of air in the brake cylinder pilot passages as compared to the brake cylinder volume of a freight car for which the service portion 15 was originally designed.

INDEPENDENT RELEASE OF A SERVICE APPLICATION

Following a service application, the locomotive brakes can be released, independent of the brakes for the rest of the train, in response to manual depression of the independent brake control lever 89 (see FIG. 1A) of the independent control valve 12. This causes pressurization of the pipe 90 in valve 12 by main reservoir pressure applied to the first pipe bracket 10 from the main reservoir 50 over pipe 51. Pipe 90 is connected through multiple unit valve 43 in its open position to pipe 91, and through passage 92 in the quick release and emergency valve portion 16, to chamber 20 at the base of piston 19 for actuating piston 19 upwardly to open check valves 17 and 18 to vent auxiliary reservoir pressure and pilot brake control pressure to atmosphere respectively. Auxiliary reservoir pressure is vented by diaphragm valve 36 through passage 64 until chamber 38 below the diaphragm 36 is substantially 4 psi below brake pipe pressure. This ensures that the service valve 80 will be actuated downwardly to release the brakes according to the normal procedure during a service application. This is by venting the brake cylinder pilot control pressure from passage 83, and thus from the brake cylinder pilot control passage 71.

After the auxiliary reservoir pressure has been reduced by the above described procedure, the independent control lever 89 can be restored to its normal position, and the locomotive brakes will remain in their release position because of the auxiliary reservoir pressure being reduced well below the brake pipe pressure. However, the locomotive brakes can be reapplied according to the usual practice by reducing the brake pipe pressure below the pressure of the auxiliary reservoir 61.

Due to the fact that during normal service applications brake pipe pressure normally does not drop below 25 psi, emergency valve 23 stays in its upwardly actuated position during independent release of a service application, thus preventing emergency brake cylinder development from occuring.

EMERGENCY APPLICATION AND RELEASE

During an emergency brake application, brake pipe pressure is rapidly vented to zero by the brake valve 11 on the locomotive (see FIG. 1A), and vent valves of other vehicles in the train. When brake pipe pressure has been reduced below approximately 25 psi, emergency valve 23 is forced down by spring 27, closing exhaust passage 32 and opening supply check valve 34 to apply pressure supplied by the main reservoir 50 through the choke 52, passage 53, chamber 33 and emergency limiting valve 24 passages 56 and 100 to the open valve 34 at the base of emergency valve 23, and through chamber 75 of the spool 30 and to the lower chamber 73 of the double check valve 40 through passage 74. Chamber 73 of double check valve 40 is connected through a passage 73a to a small stabilizing volume 73b to stabilize the initial application of emergency pressure to the brake cylinder pilot passage 71. When the emergency pressure through these passages exceeds the pressure applied at the opposite end of the double check valve 40 in chamber 84 from the service portion, the ball 101 of the check valve is actuated upwardly to cause the passage 92 to have its brake cylinder pilot pressure raised above the normal service pressure until it is cut off at a predetermined maximum emergency pressure by upward movement of the emergency limiting valve 24.

Release of an emergency application in response to increase in brake pipe pressure is accomplished in two steps. When brake pipe pressure is restored to a level above 25 psi, pressure in chamber 28, below the emergency piston 25, causes the spool valve 30 to move upwardly away from the check valve 34, and vent brake cylinder pilot pressure from central chamber 72 of the double check valve 40, and thus through the brake cylinder pilot passage 71. Chamber 72 is vented, with the ball 101 of valve 40 in its upper position, through lower passage 73 of valve 40, passage 74, chamber 75 of spool valve 30 and axial passage 32 of spool valve 30 to the exhaust chamber 70. It will be noted that this upward movement of the spool valve 30 severs connection between chamber 75 and passage 100, which is the supply passage through which emergency pressure has been supplied from main reservoir 50 as limited by the emergency limiting valve 24.

Secondly, restoration of brake pipe pressure causes the service valve 80 (see FIG. 1C) to move downwardly in the service portion 15 in the usual manner, and thus vent the brake cylinder pilot passage 71 through the upper chamber 84 of the double check valve 40, (see FIG. 1B0 with the ball 101 in its lower position.

INDEPENDENT RELEASE OF AN EMERGENCY APPLICATION

Following an emergency application, independent release can be accomplished by manual depression of the independent lever 89 (see FIG. 1A) as has been described to apply independent release pressure over passage 91 to chamber 20 (see FIG. 1B) to move piston 19 upwardly and vent auxiliary pressure in passage 64 by opening valve 17, and opening valve 18 to vent brake cylinder pilot pressure from passages 87 and 71. In addition, pressure from actuation of the independent valve 12 is applied over passages 91, 92, and 105 to a lower chamber 106 of double check valve 41 to actuate ball 107 of this valve upwardly to apply pressure to chamber 28, and thereby cause emergency piston 25 to move upwardly and vent the brake cylinder pilot pressure as has been described above.

When independent release pipe 91 is vented in independent valve 12 (see FIG. 1A) upon restoration of handle 89 to its upper position, emergency valve piston 25 (see FIG. 1B) is moved down by spring 27, and the service portion maintains the auxiliary reservoir 61 vented to zero pressure, thus eliminating the output capability of the service portion 15.

When piston 25 moves down, it reconnects main reservoir 50 through chamber 75 of limiting valve 23 and check valve 40 to relay valve 42 for reapplication of the locomotive brakes with emergency pressure.

Having thus described a freight locomotive brake control system having an improved brake control valve device as a preferred embodiment of the present invention, it is to be understood that various modifications and alterations may be made to the specific embodiment shown without departing from the spirit or scope of the present invention.

What is claimed is:

1. A fluid pressure brake control system of the direct release type for a freight locomotive comprising a first pipe bracket having a manually controllable automatic brake valve device connected thereto on one side for governing fluid brake control pressure in a train pipe, and a manual controllable independent brake valve device connected thereto on another side for governing brakes of the locomotive independent of brakes of freight cars in a train, and a brake control valve device comprising a second pipe bracket governed in part by fluid in the brake pipe for controlling brakes of a locomotive, wherein an improved brake control device and second pipe bracket comprises:
    (a) a service freight brake valve portion secured to one side of the second pipe bracket for controlling brakes of a locomotive,
    (b) the service freight brake valve portion being the same as, and interchangeable with, service valve portion conventionally used on US freight cars to control brakes of such cars, and
    (c) a quick release and emergency valve portion secured to another side of the second pipe bracket for governing emergency brake pressure and for governing independent direct release of brakes of a locomotive in response to actuation of the manually controllable independent brake valve device.

2. A fluid pressure brake control system according to claim 1 wherein the quick release and emergency valve portion comprises;
    (a) a single quick release piston operable in response to fluid pressure generated in response to actuation of the independent brake valve device for independently releasing the locomotive brakes,
    (b) a normally closed auxiliary check valve for venting auxiliary reservoir pressure, and
    (c) a normally closed brake cylinder control check valve for venting brake cylinder control pressure.

3. A fluid pressure brake control system according to claim 2 wherein the check valves are laterally disposed and have respective operating push rods bearing on the piston.

4. A fluid pressure brake control system according to claim 1 wherein the quick release and emergency valve portion comprises;
    (a) a first brake cylinder pressure control valve having a first piston and a first chamber subject to brake pipe pressure for actuating the first piston together with a connected first spool valve axially in opposition to a first biasing spring upon sensing an emergency brake pipe reduction, (b) a second brake cylinder pressure control valve having a second piston and a second chamber subject to main reservoir pressure for actuating the first piston together with a connected second spool valve axially in opposition to a second biasing spring upon sensing when a particular predetermined brake cylinder emergency control pressure has been developed and (c) the first and second spool valves having axial passages respectively for at times selectively venting brake cylinder control pressure to atmosphere, (d) the first and second brake cylinder pressure control valves also having operably associated therewith first and second check valves respectively biased in the direction of the first and second spool valves respectively for selectively governing development of emergency brake cylinder control pressure.

5. A fluid pressure brake control system according to claim 4 wherein the first and second check valves are pressure compensated so that selected control pressure applied as inputs to the valves will not be materially altered by operation of these check valves.

6. A fluid pressure brake control system according to claim 5 wherein the quick release and emergency valve portion has a first double check valve associated therewith for developing a brake cyllinder control pressure alternately in response to service auxiliary pressure or limited emergency pressure, whichever is higher.

7. A fluid pressure brake control system according to claim 6 wherein the quick release and emergency valve portion has a second double check valve associated therewith for alternately connecting the first chamber beneath the first piston to brake pipe pressure or independent release pressure, whichever is higher.

* * * * *